(12) United States Patent
Maugans et al.

(10) Patent No.: US 6,270,891 B1
(45) Date of Patent: Aug. 7, 2001

(54) ETHYLENE POLYMER HAVING IMPROVING SEALING PERFORMANCE AND ARTICLES FABRICATED FROM THE SAME

(75) Inventors: Rexford A. Maugans; Ed N. Knickerbocker, both of Lake Jackson; Rebecca J. Sawchuk, Houston; Alan R. Whetten, Lake Jackson; Ronald P. Markovich, Houston; Pak-Wing S. Chum, Lake Jackson, all of TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/490,504

(22) Filed: Jan. 25, 2000

Related U.S. Application Data

(62) Division of application No. 09/092,575, filed on Jun. 5, 1998, now Pat. No. 6,015,617.
(60) Provisional application No. 60/050,279, filed on Jun. 20, 1997.

(51) Int. Cl.[7] ................................. D01F 6/00; D01F 8/00
(52) U.S. Cl. .......................... 428/364; 525/240; 428/373
(58) Field of Search .................................. 428/364, 373, 428/374; 525/240; 521/51, 79, 85

(56) References Cited

U.S. PATENT DOCUMENTS

| | | | |
|---|---|---|---|
| 5,723,501 | * 3/1998 | Markovich et al. | 521/51 |
| 5,811,494 | * 9/1998 | Whetten et al. | 525/240 |
| 5,929,128 | * 7/1999 | Whetten et al. | 521/85 |
| 6,015,617 | * 1/2000 | Maugan et al. | 428/364 |

* cited by examiner

Primary Examiner—N. Edwards

(57) ABSTRACT

The subject invention is directed to polymer compositions having improved bond performance, to a method for improving the bond performance of a polymer composition, and to fabricated articles, such as fibers and fabrics which exhibit an improved bond performance, and to other fabricated articles, including but not limited to rotationally molded articles, prepared from polymer compositions of the invention.

11 Claims, 7 Drawing Sheets ized polypropylene with from 70
ETHYLENE POLYMER HAVING IMPROVING SEALING PERFORMANCE AND ARTICLES FABRICATED FROM THE SAME This application is a Divisional of prior application Ser. No: 09/092,575, filed on Jun. 5, 1998 now U.S. Pat. No. 6,015,617.

CROSS-REFERENCE TO RELATED APPLICATIONS

This application claims priority from U.S. provisional application No. 60/050279 filed Jun. 20, 1997.

FIELD OF THE INVENTION

This invention relates to polymer compositions having improved bonding performance. In particular, the subject invention pertains to a polymer composition comprising a blend of a homogeneous ethylene/α-olefin interpolymer and a higher density polymer. The subject invention further pertains to the use of polymer compositions having improved bonding performance in various end use applications, such as fibers, nonwoven fabrics and articles fabricated therefrom (e.g., disposable incontinence garments or diapers, and rotational molded articles. The fibers have good spinnability, and result in a fabric having good bond strength and good elongation. The rotational molded articles have good ESCR, flexural modulus, Dart Impact B, and Izod Impact.

BACKGROUND OF THE INVENTION

Fiber is typically classified according to its diameter. Monofilament fiber is generally defined as having an individual fiber diameter greater than 15 denier, usually greater than 30 denier per filament. Fine denier fiber generally refers to a fiber having a diameter less than 15 denier per filament. Microdenier fiber is generally defined as fiber having less than 100 microns diameter. The fiber can also be classified by the process by which it is made, such as monofilament, continuous wound fine filament, staple or short cut fiber, spun bond, and melt blown fiber.

A variety of fibers and fabrics have been made from thermoplastics, such as polypropylene, highly branched low density polyethylene (LDPE) made typically in a high pressure polymerization process, linear heterogeneously branched polyethylene (e.g., linear low density polyethylene made using Ziegler catalysis), blends of polypropylene and linear heterogeneously branched polyethylene, blends of linear heterogeneously branched polyethylene, and ethylene/vinyl alcohol copolymers.

Of the various polymers known to be extrudable into fiber, highly branched LDPE has not been successfully melt spun into fine denier fiber. Linear heterogeneously branched polyethylene has been made into monofilament, as described in U.S. Pat. No. 4,076,698 (Anderson et al.), the disclosure of which is incorporated herein by reference. Linear heterogeneously branched polyethylene has also been successfully made into fine denier fiber, as disclosed in U.S. Pat. No. 4,644,045 (Fowells), U.S. Pat. No. 4,830,907 (Sawyer et al.), U.S. Pat. No. 4,909,975 (Sawyer et al.) and in U.S. Pat. No. 4,578,414 (Sawyer et al.), the disclosures of which are incorporated herein by reference. Blends of such heterogeneously branched polyethylene have also been successfully made into fine denier fiber and fabrics, as disclosed in U.S. Pat. No. 4,842,922 (Krupp et al.), U.S. Pat. No. 4,990,204 (Krupp et al.) and U.S. Pat. No. 5,112,686 (Krupp et al.), the disclosures of which are all incorporated herein by reference. U.S. Pat. No. 5,068,141 (Kubo et al.) also discloses making nonwoven fabrics from continuous heat bonded filaments of certain heterogeneously branched LLDPE having specified heats of fusion. While the use of blends of heterogeneously branched polymers produces improved fabric, the polymers are more difficult to spin without fiber breaks.

U.S. Pat. No. 5,549,867 (Gessner et al.), describes the addition of a low molecular weight polyolefin to a polyolefin with a molecular weight ($M_z$) of from 400,000 to 580,000 to improve spinning. The Examples set forth in Gessner et al. are directed to blends of 10 to 30 weight percent of a lower molecular weight metallocene polypropylene with from 70 to 90 weight percent of a higher molecular weight polypropylene produced using a Ziegler-Natta catalyst.

WO 95/32091 (Stahl et al.) discloses a reduction in bonding temperatures by utilizing blends of fibers produced from polypropylene resins having different melting points and produced by different fiber manufacturing processes, e.g., meltblown and spunbond fibers. Stahl et al. claims a fiber comprising a blend of an isotactic propylene copolymer with a higher melting thermoplastic polymer. However, while Stahl et al. provides some teaching as to the manipulation of bond temperature by using blends of different fibers, Stahl et al. does not provide guidance as to means for improving fabric strength of fabric made from fibers having the same melting point.

U.S. patent application Ser. No. 544,497, in the names of Lai, Knight, Chum, and Markovich, incorporated herein by reference, discloses blends of substantially linear ethylene polymers with heterogeneously branched ethylene polymers, and the use of such blends in a variety of end use applications, including fibers. The disclosed compositions preferably comprise a substantially linear ethylene polymer having a density of at least 0.89 grams/centimeters$^3$. However, Lai et al. disclosed fabrication temperatures only above 165° C. In contrast, to preserve fiber integrity, fabrics are frequently bonded at lower temperatures, such that all of the At crystalline material is not melted before or during fusion.

European Patent Publication (EP) 340,982 discloses bicomponent fibers comprising a first component core and a second component sheath, which second component further comprises a blend of an amorphous polymer with an at least partially crystalline polymer. The disclosed range of the amorphous polymer to the crystalline polymer is from 15:85 to 00[sic, 90]:10. Preferably, the second component will comprise crystalline and amorphous polymers of the same general polymeric type as the first component, with polyester being preferred. For instance, the examples disclose the use of an amorphous and a crystalline polyester as the second component.

EP 340,982, at Tables I and II, indicates that as the melt index of the amorphous polymer decreases, the web strength likewise detrimentally decreases. Incumbent polymer compositions include linear low density polyethylene and high density polyethylene having a melt index generally in the range of 0.7 to 200 grams/10 minutes.

While such polymers have found good success in the marketplace in fiber applications, the fibers made from such polymers would benefit from an improvement in bond strength, which would lead to stronger fabrics, and accordingly to increased value to the nonwoven fabric and article manufacturers, as well as to the ultimate consumer.

However, any benefit in bond strength must not be at the cost of a detrimental reduction in spinnability or a detrimental increase in the sticking of the fibers or fabric to equipment during processing.

SUMMARY OF THE INVENTION

It has been found that the inclusion of a low melting point homogeneous polymer to a higher melting point polymer having an optimum melt index can usefully provide a calendered fabric having an improved bond performance, while maintaining adequate fiber spinning performance. Accordingly, the subject invention provides a fiber having a diameter in a range of from 0.1 to 50 denier which is prepared from a polymer blend, wherein the polymer blend comprises:

a. from 0.5 percent to 25 weight percent (by weight of the polymer blend) of a first polymer which is a homogeneous ethylene/α-olefin interpolymer having:
  i. a melt index of from 0.5 to 100 grams/10 minutes, and
  ii. a density of from 0.855 to 0.950 grams/centimeters$^3$, and
b. a second polymer which is an ethylene homopolymer or an ethylene/α-olefin interpolymer having:
  i. a melt index of from 0.5 to 500 grams/10 minutes, and
  ii. a density which is at least 0.01 grams/centimeters$^3$ greater, preferably at least 0.03 grams/centimeters$^3$ greater, more preferably at least 0.05 grams/centimeters$^3$ greater, and most preferably at least 0.07 grams/centimeters$^3$ greater than the density of the first polymer, wherein the fiber is bondable at a temperature less than 165° C.

Preferably, the fiber of the invention will be prepared from a polymer composition comprising:
a. at least one substantially linear ethylene/α-olefin interpolymer having:
  i. a melt flow ratio, $I_{10}/I_2, \geq 5.63$,
  ii. a molecular weight distribution, $M_w/M_n$, defined by the equation:

$$M_w/M_n \leq (I_{10}/I_2) - 4.63,$$

iii. a critical shear rate at onset of surface melt fracture of at least 50 percent greater than the critical shear rate at the onset of surface melt fracture of a linear ethylene polymer having about the same $I_2$ and $M_w/M_n$, and
  iv. a density less than about 0.90 grams/centimeters$^3$, and
b. at least one ethylene polymer having a density greater than 0.935 grams/centimeters$^3$.

The subject invention further provides a method for improving the bonding strength of an ethylene homopolymer or an ethylene/α-olefin interpolymer having a density of at least 0.935 grams/centimeters$^3$ and a melt index of from greater than 0.5 to 500 grams/10 minute, comprising providing in an intimate admixture therewith from 0.5 to less than 10 weight percent of a homogeneous linear or substantially linear ethylene/α-olefin interpolymer having a density of from 0.855 to 0.890 grams/centimeters$^3$ and a melt index of from 0.1 to 100 grams/10 minutes.

The subject invention further provides a polymer composition having improved bond strength, comprising:
a. from 0.5 percent to less than 10 weight percent (by weight of the polymer blend) of a first polymer which is a homogeneous ethylene/α-olefin interpolymer having:
  i. a melt index of from 0.1 to 100 grams/10 minutes, and
  ii. a density of from 0.855 to 0.890 grams/centimeters$^3$; and
b. a second polymer which is an ethylene homopolymer or an ethylene/α-olefin interpolymer having:
  i. a melt index of from 0.5 to 500 grams/10 minutes, and
  ii. a density which is at least 0.01 grams/centimeters$^3$ greater, preferably at least 0.03 grams/centimeters$^3$ greater, more preferably at least 0.05 grams/centimeters$^3$ greater, and most preferably at least 0.07 grams/centimeters$^3$ greater than the density of the first polymer.

The subject invention further provides a fiber having a diameter in a range of from 0.1 to 50 deniers which is prepared from a polymer composition characterized as having a soluble fraction at 30° C., as determined from a CRYSTAF crystallization kinetic curve, of at least 0.5 weight percent, and wherein the fiber is bondable at a temperature of less than 165° C.

The subject invention further provides a polymer composition of the invention, in the form of a fiber, fabric, nonwoven article, rotomolded article, film layer, injection molded article, blow molded article, injection blow molded article, or extrusion coating composition.

The inventive fibers and fabrics can be produced on conventional synthetic fiber or fabric processes (e.g., carded staple, spun bond, melt blown, and flash spun) and they can be used to produce fabrics having high elongation and tensile strength, without a significant sacrifice in fiber spinnability, particularly when the polymer composition contains a first polymer having an optimum melt index for the application in which it is utilized. The polymer compositions of the invention have excellent processability, enabling the preparation of the fibers and fabrics of the invention using conventional equipment.

These and other embodiments are more fully described in the detailed description, in conjunction with the following figures.

DETAILED DESCRIPTION OF THE INVENTION

Figure 1:
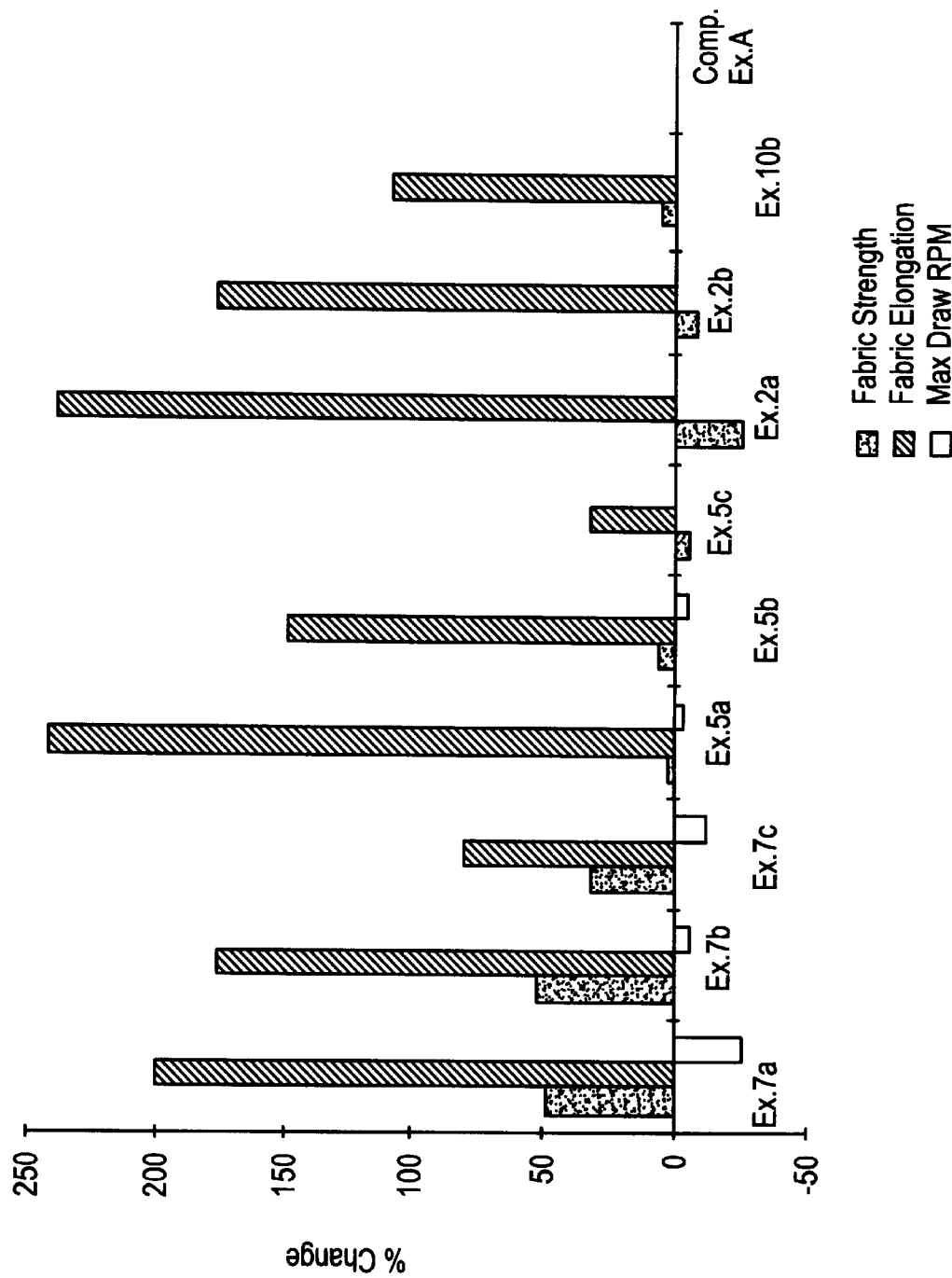
FIG. 1 is a bar chart illustrating the fabric bond strength, fabric elongation, and spinnability of fibers of examples of the invention and comparative examples.

The homogeneously branched substantially linear ethylene polymers used in the polymer compositions disclosed herein can be interpolymers of ethylene with at least one $C_3$–$C_{20}$ α-olefin. The term "interpolymer" and "ethylene polymer" used herein indicates that the polymer can be a copolymer, a terpolymer. Monomers usefully copolymerized with ethylene to make the homogeneously branched linear or substantially linear ethylene polymers include the $C_3$–$C_{20}$ α-olefins especially 1-pentene, 1-hexene, 4-methyl-1-pentene, and 1-octene. Especially preferred comonomers include 1-pentene, 1-hexene and 1-octene. Copolymers of ethylene and a C3–$C_{20}$ α-olefin are especially preferred.

The term "substantially linear" means that the polymer backbone is substituted with 0.01 long chain branches/1000 carbons to 3 long chain branches/1000 carbons, more preferably from 0.01 long chain branches/1000 carbons to 1 long chain branches/1000 carbons, and especially from 0.05 long chain branches/I 000 carbons to 1 long chain branches/1000 carbons.

Long chain branching is defined herein as a branch having a chain length greater than that of any short chain branches which are a result of comonomer incorporation. The long chain branch can be as long as about the same length as the length of the polymer back-bone.

Long chain branching can be determined by using $^{13}C$ nuclear magnetic resonance (NMR) spectroscopy and is quantified using the method of Randall (*Rev. Macromol. Chem. Phys.*, C29 (2&3), p. 275–287), the disclosure of which is incorporated herein by reference.

In the case of substantially linear ethylene polymers, such polymers can. be characterized as having:

a) a melt flow ratio, $I_{10}/I_2 \geq 5.63$, b) a molecular weight distribution, $M_w/M_n$, defined by the equation:

$$M_w/M_n \leq (I_{10}/I_2) - 4.63, \text{ and}$$

c) a critical shear stress at onset of gross melt fracture greater than $4 \times 10^6$ dynes/cm$^2$ and/or a critical shear rate at onset of surface melt fracture at least 50 percent greater than the critical shear rate at the onset of surface melt fracture of either a homogeneously or heterogeneously branched linear ethylene polymer having about the same $I_2$ and $M_w/M_n$.

In contrast to substantially linear ethylene polymers, linear ethylene polymers lack long chain branching, i.e., they have less than 0.01 long chain branches/1000 carbons. The term "linear ethylene polymers" thus does not refer to high pressure branched polyethylene, ethylene/vinyl acetate copolymers, or ethylene/vinyl alcohol copolymers which are known to those skilled in the art to have numerous long chain branches.

Linear ethylene polymers include, for example, the traditional heterogeneously branched linear low density polyethylene polymers or linear high density polyethylene polymers made using Ziegler polymerization processes (e.g., U.S. Pat. No. 4,076,698 (Anderson et al.)) the disclosure of which is incorporated herein by reference), or homogeneous linear polymers (e.g., U.S. Pat. No. 3,645,992 (Elston) the disclosure of which is incorporated herein by reference).

Both the homogeneous linear and the substantially linear ethylene polymers used to form the fibers have homogeneous branching distributions. The term "homogeneously branching distribution" means that the comonomer is randomly distributed within a given molecule and that substantially all of the copolymer molecules have the same ethylene/comonomer ratio. The homogeneous ethylene/α-olefin polymers used in this invention essentially lack a measurable "high density" fraction as measured by the TREF technique (i.e., the homogeneous branched ethylene/α-olefin polymers are characterized as typically having less than 15 weight percent, preferably less than 10 weight percent, and more preferably less than 5 weight percent of a polymer fraction with a degree of branching less than or equal to 2 methyls/1000 carbons).

The homogeneity of the branching distribution can be measured variously, including measuring the SCBDI (Short Chain Branch Distribution Index) or CDBI (Composition Distribution Branch Index). SCBDI or CDBI is defined as the weight percent of the polymer molecules having a comonomer content within 50 percent of the median total molar comonomer content. The CDBI of a polymer is readily calculated from data obtained from techniques known in the art, such as, for example, temperature rising elusion fractionation (abbreviated herein as "TREF")as described, for example, in Wild et al, *Journal of Polymer Science, Poly. Phys. Ed.*, Vol. 20, p. 441 (1982), U.S. Pat. No. 5,008,204 (Stehling), the disclosure of which is incorporated herein by reference. The technique for calculating CDBI is described in U.S. Pat. No. 5,322,728 (Davey et al.) and in U.S. Pat. No. 5,246,783 (Spenadel et al.), both disclosures of which are incorporated herein by reference. The SCBDI or CDBI for homogeneously branched linear and substantially linear ethylene polymers is typically greater than 30 percent, and is preferably greater than 50 percent, more preferably greater than 60 percent, even more preferably greater than 70 percent, and most preferably greater than 90 percent.

The homogeneous linear and substantially linear ethylene polymers used to make the fibers of the present invention will typically have a single melting peak, as measured using differential scanning calorimetry (DSC), in contrast to heterogeneously branched linear ethylene polymers, which have 2 or more melting peaks, due to the heterogeneously branched polymer's broad branching distribution.

Substantially linear ethylene polymers exhibit a highly unexpected flow property where the $I_{10}/I_2$ value of the polymer is essentially independent of polydispersity index (i.e., $M_w/M_n$) of the polymer. This is contrasted with conventional homogeneous linear ethylene polymers and heterogeneously branched linear polyethylene resins for which one must increase the polydispersity index in order to increase the $I_{10}/I_2$ value. Substantially linear ethylene polymers also exhibit good processability and low pressure drop through a spinneret pack, even when using high shear filtration.

Homogeneous linear ethylene polymers useful to make the fibers and fabrics of the invention are a known class of polymers which have a linear polymer backbone, no long chain branching and a narrow molecular weight distribution. Such polymers are interpolymers of ethylene and at least one α-olefin comonomer of from 3 to 20 carbon atoms, and are preferably copolymers of ethylene with a $C_3$–$C_{20}$ α-olefin, and are most preferably copolymers of ethylene with propylene, 1-butene, 1-hexene, 4-methyl-1-pentene or 1-octene. This class of polymers is disclosed, for example, by Elston in U.S. Pat. No. 3,645,992 and subsequent processes to produce such polymers using metallocene catalysts have been developed, as shown, for example, in EP 0 129 368, EP 0 260 999, U.S. Pat. No. 4,701,432; U.S. Pat. No. 4,937,301; U.S. Pat. No. 4,935,397; U.S. Pat. No. 5,055,438; and WO 90/07526, and others. The polymers can be made by conventional polymerization processes (e.g., gas phase, slurry, solution, and high pressure).

The first polymer will be a homogeneous linear or substantially linear ethylene polymer, having a density, as measured in accordance with ASTM D-792 of at least 0.850 grams/centimeters$^3$, preferably at least 0.855 grams/centimeters$^3$, and more preferably at least 0.860 grams/centimeters$^3$; and which is typically no more than 0.920 grams/centimeters$^3$, preferably no more than 0.900 grams/centimeters$^3$, more preferably no more that 0.890 grams/centimeters$^3$, and most preferably no more than 0.880 grams/centimeters$^3$. When the second polymer is an ethylene polymer, the second polymer will have a density which is at least 0.01 grams/centimeters$^3$, preferably at least 0.03 grams/centimeters$^3$, more preferably at least 0.05 grams/centimeters$^3$, and most preferably at least 0.07 grams/ centimeters³ greater than that of the first polymer. The second polymer will typically have a density of at least 0.880 grams/centimeters³, preferably at least 0.900 grams/centimeters³, more preferably at least 0.935 grams/centimeters³, even more preferably at least 0.940 grams/centimeters³ and most preferably at least 0.950 grams/centimeters³.

The molecular weight of the first and second polymers used to make the fibers and fabrics of the present invention is conveniently indicated using a melt index measurement according to ASTM D-1238, Condition 190° C./2.16 kg (formally known as "Condition (E)" and also known as $I_2$). Melt index is inversely proportional to the molecular weight of the polymer. Thus, the higher the molecular weight, the lower the melt index, although the relationship is not linear. The melt index for the first polymer is generally at least 0.1 grams/10 minutes, preferably at least 0.5 grams/10 minutes, more preferably at least 1 grams/10 minutes; generally no more than 100 grams/10 minutes, preferably no more than 30 grams/10 minutes, more preferably no more than 10 grams/10 minutes, even more preferably no more than 5 grams/10 minutes, and most preferably no more than 1.5 grams/10 minutes The melt index for the second polymer is generally at least 0.5 grams/10 minutes preferably at 3 grams/10 minutes, and more preferably at least 5 grams/10 minutes.

In the case of melt blown fibers, the melt index for the second polymer is preferably at least 50 grams/10 minutes, more preferably at least 100 grams/10 minutes; preferably no more than 1000 grams/10 minutes, more preferably no more than 500 grams/10 minutes For spunbond fibers, the melt index of the second polymer is preferably at least 15 grams/10 minutes, more preferably at least 25 grams/10 minutes; preferably no more than 100 grams/10 minutes, more preferably no more than 35 grams/10 minutes For staple fibers, the melt index of the second polymer is preferably at least 8 grams/10 minutes, more preferably at least 10 grams/10 minutes; preferably no more than 35 grams/10 minutes, more preferably no more than 25 grams/10 minutes. For flash spun fibers, the melt index of the second polymer is preferably at least 0.1 grams/10 minutes, more preferably at least 0.5 grams/10 minutes; preferably no more than 3 grams/10minutes, more preferably no more than 2 grams/10 minutes.

In the case of polymer compositions for use in rotational molded articles, the melt index of the first polymer is preferably at least 0.5 grams/10 minutes, and is preferably at least 1.0 grams/10 minutes; preferably no more than 20 grams/10 minutes, more preferably no more than 10 grams/10 minutes, most preferably no more than 5 grams/10 minutes. In the case of polymer compositions for use in rotational molded articles, the melt index of the second polymer is preferably at least 3 grams/10. minutes, more preferably at least 5 grams/10 minutes; preferably no more than 50 grams/10 minutes, more preferably no more than 20 grams/10 minutes, and most preferably no more than 10 grams/10 minutes.

Another measurement useful in characterizing the molecular weight of ethylene polymers is conveniently indicated using a melt index measurement according to ASTM D-1238, Condition 190° C./10 kg (formerly known as "Condition (N)" and also known as $I_{10}$). The ratio of these two melt index terms is the melt flow ratio and is designated as $I_{10}/I_2$. For the substantially linear ethylene polymers used polymer compositions useful in making the fibers of the invention, the $I_{10}/I_2$ ratio indicates the degree of long chain branching, i.e., the higher the $I_{10}/I_2$ ratio, the more long chain branching in the polymer. The substantially linear ethylene polymers can have varying $I_{10}/I_2$ ratios, while maintaining a low molecular weight distribution (i.e., $M_w/M_n$ from 1.5 to 2.5). Generally, the $I_{10}/I_2$ ratio of the substantially linear ethylene polymers is at least 5.63, preferably at least 6, more preferably at least 7, and especially at least 8. Generally, the upper limit of $I_{10}/I_2$ ratio for the homogeneously branched substantially linear ethylene polymers is 50 or less, preferably 30 or less, and especially 20 or less.

Additives such as antioxidants (e.g., hindered phenolics (e.g., Irganox® 1010 made by Ciba-Geigy Corp.), phosphites (e.g., Irgafos®) 168 made by Ciba-Geigy Corp.), cling additives (e.g., polyisobutylene (PIB)), antiblock additives, pigments, can also be included in the first polymer, the second polymer, or the overall polymer composition useful to make the fibers and fabrics of the invention, to the extent that they do not interfere with the enhanced fiber and fabric properties discovered by Applicants.

Molecular Weight Distribution Determination

The whole interpolymer product samples and the individual interpolymer components are analyzed by gel permeation chromatography (GPC) on a Waters 150° C. high temperature chromatographic unit equipped with mixed porosity columns operating at a system temperature of 140° C. The solvent is 1,2,4-trichlorobenzene, from which 0.3 percent by weight solutions of the samples are prepared for injection. The flow rate is 1.0 milliliters/minute and the injection size is 100 microliters.

The molecular weight determination is deduced by using narrow molecular weight distribution polystyrene standards (from Polymer Laboratories) in conjunction with their elusion volumes. The equivalent polyethylene molecular weights are determined by using appropriate Mark-Houwink coefficients for polyethylene and polystyrene (as described by Williams and Ward in *Journal of Polymer Science, Polymer Letters*, Vol. 6, (621) 1968) to derive the following equation:

$$M_{polyethylene}=a*(M_{polystyrene})^b$$

In this equation, a=0.4316 and b=1.0. Weight average molecular weight, $M_w$, and number average molecular weight, $M_n$, is calculated in the usual manner according to the following formula:

$$M_j=(\Sigma w_i(M_i^j))^j;$$

where $w_i$ is the weight fraction of the molecules with molecular weight $M_i$ eluting from the GPC column in fraction i and j=1 when calculating $M_w$ and j=−1 when calculating $M_n$.

The $M_w/M_n$ of the substantially linear homogeneously branched ethylene polymers is defined by the equation:

$$M_w/M_n \leq (I_{10}/I_2)-4.63$$

Preferably, the MJIMN for both the homogeneous linear and substantially linear ethylene polymer is from 1.5 to 2.5, and especially from 1.8 to 2.2.

An apparent shear stress versus apparent shear rate plot is used to identify the melt fracture phenomena. According to Ramamurthy in *Journal of Rheology* 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular gloss to the more severe form of "sharkskin". In this disclosure, the onset of surface melt fracture is characterized at the beginning of losing extrudate gloss at which the surface roughness of extrudate can only be detected by 40× magnification. The critical shear rate at onset of surface melt fracture for a substantially linear ethylene polymer is at least 50 percent greater than the critical shear rate at the onset of surface melt fracture of a homogeneous linear ethylene polymer having the same $I_2$ and $M_w/M_n$.

Gross melt fracture occurs at unsteady flow conditions and ranges in detail from regular (alternating rough and smooth, helical, etc.) to random distortions. For commercial acceptability, (e.g., in blown film products), surface defects should be minimal, if not absent. The critical shear rate at onset of surface melt fracture (OSMF) and onset of gross melt fracture (OGMF) will be used herein based on the changes of surface roughness and configurations of the extrudates extruded by a GER.

The gas extrusion rheometer is described by M. Shida, R. N. Shroff and L. V. Cancio in *Polymer Engineering Science*, Vol. 17, no. 11, p. 770 (1977), and in "Rheometers for Molten Plastics" by John Dealy, published by Van Nostrand Reinhold Co. (1982) on page 97, both publications of which are incorporated by. reference herein in their entirety. All GER experiments are performed at a temperature of 190° C., at nitrogen pressures between 5250 to 500 psig using a 0.0296 inch diameter, 20:1 L/D die. An apparent shear stress vs. apparent shear rate plot is used to identify the melt fracture phenomena. According to Ramamurthy in *Journal of Rheology*, 30(2), 337–357, 1986, above a certain critical flow rate, the observed extrudate irregularities may be broadly classified into two main types: surface melt fracture and gross melt fracture.

For the polymers described herein, the PI is the apparent viscosity (in Kpoise) of a material measured by GER at a temperature of 190° C., at nitrogen pressure of 2500 psig using a 0.0296 inch diameter, 20:1 L/D die, or corresponding apparent shear stress of $2.15 \times 10^6$ dyne/cm$^2$.

The processing index is measured at a temperature of 190° C., at nitrogen pressure of 2500 psig using 0.0296 inch diameter, 20:1 L/D die having an entrance angle of 180°.

The Constrained Geometry Catalyst

Exemplary constrained geometry catalysts for use in polymerizing the homogeneously branched substantially linear ethylene polymers used to make the fibers preferably include constrained geometry catalysts as disclosed in U.S. application Ser. Nos.: 545,403, filed Jul. 3, 1990; 758,654, now U.S. Pat. No. 5,132,380; 758,660, now abandoned, filed Sep. 12, 1991; and 720,041, now abandoned, filed Jun. 24, 1991, and in U.S. Pat. No. 5,272,236 and U.S. Pat. No. 5,278,272.

Polymerization

The polymers may be produced via a continuous (as opposed to a batch) controlled polymerization process using at least one reactor, but can also be produced using multiple reactors (e.g., using a multiple reactor configuration as described in U.S. Pat. No. 3,914,342 (Mitchell), incorporated herein by reference), with the second ethylene polymer polymerized in at least one other reactor. The multiple reactors can be operated in series or in parallel, with at least one constrained geometry catalyst employed in at least one of the reactors at a polymerization temperature and pressure sufficient to produce the ethylene polymers having the desired properties. According to a preferred embodiment of the present process, the polymers are produced in a continuous process, as opposed to a batch process. Preferably, the polymerization temperature is from 20° C. to 250° C., using constrained geometry catalyst technology. If a narrow molecular weight distribution polymer ($M_w/M_n$ of from 1.5 to 2.5) having a higher $I_{10}/I_2$ ratio (e.g., $I_{10}/I_2$ of 7 or more, preferably at least 8, especially at least 9) is desired, the ethylene concentration in the reactor is preferably not more than 8 percent by weight of the reactor contents, especially not more than 4 percent by weight of the reactor contents. Preferably, the polymerization is performed in a solution polymerization process. Generally, manipulation of $I_{10}/I_2$ while holding $M_w/M_n$ relatively low for producing the substantially linear polymers described herein is a function of reactor temperature and/or ethylene concentration. Reduced ethylene concentration and higher temperature generally produces higher $I_{10}/I_2$.

The polymerization conditions for manufacturing the homogeneous linear or substantially linear ethylene polymers used to make the fibers of the present invention are generally those useful in the solution polymerization process, although the application of the present invention is not limited thereto. Slurry and gas phase polymerization processes are also believed to be useful, provided the proper catalysts and polymerization conditions are employed.

One technique for polymerizing the homogeneous linear ethylene polymers useful herein is disclosed in U.S. Pat. No. 3,645,992 (Elston), the disclosure of which is incorporated herein by reference.

In general, the continuous polymerization according to the present invention may be accomplished at conditions well known in the prior art for Ziegler-Natta or Kaminsky-Sinn type polymerization reactions, that is, temperatures from 0 to 250° C. and pressures from atmospheric to 1000 atmospheres (100 MPa).

The compositions disclosed herein can be formed by any convenient method, including dry blending the individual components and subsequently melt mixing or by pre-melt mixing in a separate extruder (e.g., a Banbury mixer, a Haake mixer, a Brabender internal mixer, or a twin screw extruder).

Another technique for making the compositions in-situ is disclosed in pending U.S. Ser. No. 08/010,958, entitled Ethylene Interpolymerizations, which was filed Jan. 29, 1993 in the names of Brian W. S. Kolthammer and Robert S. Cardwell, the disclosure of which is incorporated herein in its entirety by reference. U.S. Ser. No. 08/010,958 describes, inter alia, interpolymerizations of ethylene and $C_3$–$C_{20}$ alpha-olefins using a homogeneous catalyst in at least one reactor and a heterogeneous catalyst in at least one other reactor. The reactors can be operated sequentially or in parallel.

The compositions can also be made by fractionating a heterogeneous ethylene/α-olefin polymer into specific polymer fractions with each fraction having a narrow composition (i.e., branching) distribution, selecting the fraction having the specified properties, and blending the selected fraction in the appropriate amounts with another ethylene polymer. This method is obviously not as economical as the in-situ interpolymerizations of U.S. Ser. No. 08/010,958, but can be used to obtain the compositions of the invention.

The polymer compositions disclosed herein may be characterized by CRYSTAF crystallization techniques, more fully disclosed in conjunction with the examples. Preferably, the polymer compositions will be characterized as having a CRYSTAF soluble fraction at 30° C. of at least 0.5, preferably at least 1, and more preferably at least 3 percent; preferably no more than 20, more preferably no more than 15, and most preferably no more than 10, and most preferably no more than 8.

Fibers and/or Fabric

Preferably, the fiber of the invention will be a homofil fiber, sometimes referred to as a homofilament fiber. Homofil fibers are those fibers which have a single region (domain) and do not have other distinct polymer regions (as do bicomponent fibers). These homofil fibers include staple fibers, spunbond fibers, melt blown fibers (using, e.g., systems as disclosed in U.S. Pat. No. 4,340,563 (Appel et al.), U.S. Pat. No. 4,663,220 (Wisneski et al.), U.S. Pat. No. 4,668,566 (Braun), U.S. Pat. No. 4,322,027 (Reba), U.S. Pat. No. 3,860,369, all of which are incorporated herein by reference), gel spun fibers (e.g., the system disclosed in U.S. Pat. No. 4,413,110 (Kavesh et al.), incorporated herein by reference), and flash spun fibers (e.g., the system disclosed in U.S. Pat. No. 3,860,369).

As defined in *The Dictionary of Fiber & Textile Technology*, by Hoechst Celanese Corporation, gel spinning refers to "[a] spinning process in which the primary mechanism of solidification is the gelling of the polymer solution by cooling to form a gel filament consisting of precipitated polymer and solvent. Solvent removal is accomplished following solidification by washing in a liquid bath. The resultant fibers can be drawn to give a product with high tensile strength and modulus."

As defined in *The Nonwoven Fabrics Handbook*, by John R. Starr, Inc., produced by INDA, Association of the Nonwoven Fabrics Industry, flash spinning refers to "a modified spunbonding method in which a polymer solution is extruded and rapid solvent evaporation occurs so that the individual filaments are disrupted into a highly fibrillar form and are collected on a screen to form a web."

Staple fibers can be melt spun (i.e., they can be extruded into the final fiber diameter directly without additional drawing), or they can be melt spun into a higher diameter and subsequently hot or cold drawn to the desired diameter using conventional fiber drawing techniques. The novel fibers disclosed herein can also be used as bonding fibers, especially where the novel fibers have a lower melting point than the surrounding matrix fibers. In a bonding fiber application, the bonding fiber is typically blended with other matrix fibers and the entire structure is subjected to heat, where the bonding fiber melts and bonds the surrounding matrix fiber. Typical matrix fibers which benefit from use of the novel fibers includes, but is not limited to: poly(ethylene terephthalate) fibers; cotton fibers; nylon fibers; polypropylene fibers; other heterogeneously branched polyethylene fibers; and linear polyethylene homopolymer fibers. The diameter of the matrix fiber can vary depending upon the end use application.

Bicomponent fibers can also be made from the polymer compositions disclosed herein. Such bicomponent fibers have the polymer composition disclosed herein in at least one portion of the fiber. For example, in a sheath/core bicomponent fiber (i.e., one. in which the sheath concentrically surrounds the core), the ethylene polymer blend can be in either the sheath or the core. Different ethylene polymer blends can also be used independently as the sheath and the core in the same fiber and especially where the sheath component has a lower melting point than the core component. Other types of bicomponent fibers are within the scope of the invention as well, and include such structures as side-by-side fibers (e.g., fibers having separate regions of polymers, wherein the ethylene polymer blend comprises at least a portion of the fiber's surface). One embodiment is in a bicomponent fiber wherein the polymer composition disclosed herein is provided in the sheath, and a higher melting polymer, such as polyester terephthalate or polypropylene is provided in the core.

The shape of the fiber is not limited. For example, typical fiber have a circular cross sectional shape, but sometimes fibers have different shapes, such as a trilobal shape, or a flat (i.e., "ribbon" like) shape. The fiber disclosed herein is not limited by the shape of the fiber.

Fiber diameter can be measured and reported in a variety of fashions. Generally, fiber diameter is measured in denier per filament. Denier is a textile term which is defined as the grams of the fiber per 9000 meters of that fiber's length. Monofilament generally refers to an extruded strand having a denier per filament greater than 15, usually greater than 30. Fine denier fiber generally refers to fiber having a denier of 15 or less. Microdenier (aka microfiber) generally refers to fiber having a diameter not greater than 100 micrometers. For the novel fibers disclosed herein, the diameter can be widely varied. However, the fiber denier can be adjusted to suit the capabilities of the finished article and as such, would preferably be: from 0.5 to 30 denier/filament for melt blown; from 1 to 30 denier/filament for spunbond; and from 1 to 20,000 denier/filament for continuous wound filament.

Fabrics made from such novel fibers include both woven and nonwoven fabrics. Nonwoven fabrics can be made variously, including spunlaced (or hydrodynamically entangled) fabrics as disclosed in U.S. Pat. No. 3,485,706 (Evans) and U.S. Pat. No. 4,939,016 (Radwanski et al.), the disclosures of which are incorporated herein by reference; by carding and thermally bonding staple fibers; by spunbonding continuous fibers in one continuous operation; or by melt blowing fibers into fabric and subsequently calendering or thermally bonding the resultant web. These various nonwoven fabric manufacturing techniques are well known to those skilled in the art and the disclosure is not limited to any particular method. Other structures made from such fibers are also included within the scope of the invention, including e.g., blends of these novel fibers with other fibers (e.g., poly(ethylene terephthalate) (PET) or cotton).

Useful nonlimiting additive materials include pigments, antioxidants, stabilizers, surfactants (e.g., as disclosed in U.S. Pat. No. 4,486,552 (Niemann), U.S. Pat. No. 4,578,414 (Sawyer et al.) or U.S. Pat. No. 4,835,194 (Bright et al.), the disclosures of all of which are incorporated herein by reference).

In preferred embodiments of the invention, fabrics prepared from fibers of the invention will exhibit a fabric elongation which is at least 20 percent, more preferably at least 50 percent, and most preferably at least 100 percent greater than that of fabric prepared with fibers prepared from unmodified second polymer.

In preferred embodiments of the invention, fabrics prepared from fibers of the invention will exhibit a fabric strength which is at least 5 percent, more preferably at least 10 percent, and most preferably at least 20 percent of fabric prepared from fiber prepared from unmodified second polymer.

In preferred embodiments of the invention, fibers of the invention will exhibit a spinnability (maximum draw rpms) which is no more than 25 percent less than, more preferably no more than 15 percent less than the spinnability (maximum draw rpms) of fiber prepared from unmodified second polymer. Draw rpms may also be correlated to draw pressure on a spun bond process.

Fabricated Articles

Useful articles which can be made from the polymer compositions disclosed herein include films, fibers, and molded articles (e.g., blow molded articles, injection molded articles and rotomolded articles).

The subject invention is particularly usefully employed in the preparation of calendar roll bonded fabrics. Exemplary end use articles include, but not limited to, diaper and other personal hygiene article components, disposable clothing (such as hospital garments), durable clothing (such as insulated outerwear), disposable wipes, dishcloths, etc.

The subject invention is further usefully employed in the bonding of As carpet or upholstery components, and in the bonding and/or strengthening of other webs (such as industrial shipping sacks, strapping and rope, lumber wraps, pool covers, geotextiles, and tarpaulins).

The subject invention may further find utility in adhesive formulations, optionally in combination with one or more tackifiers, plasticizers, or waxes.

Experimental

The first polymer and the second polymer were dry blended in the amounts indicated in the following Table One. The two components were then fed to a 30 mm twin screw extruder WPZSK30 and melt blended together.

Figure 3:
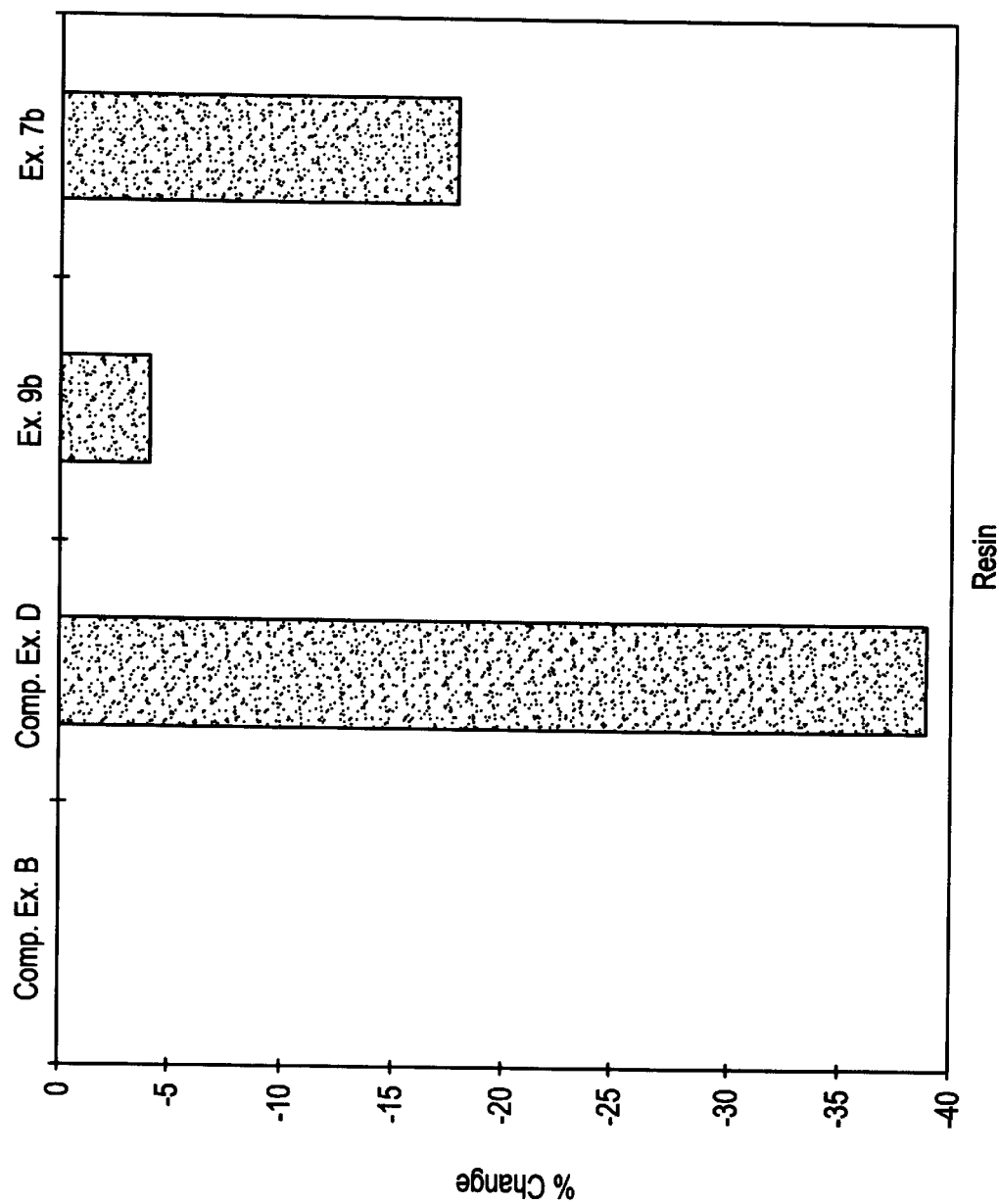
FIG. 3 is a bar chart illustrating the spinnability of fibers of examples of the invention and a comparative example.
Figure 4A:
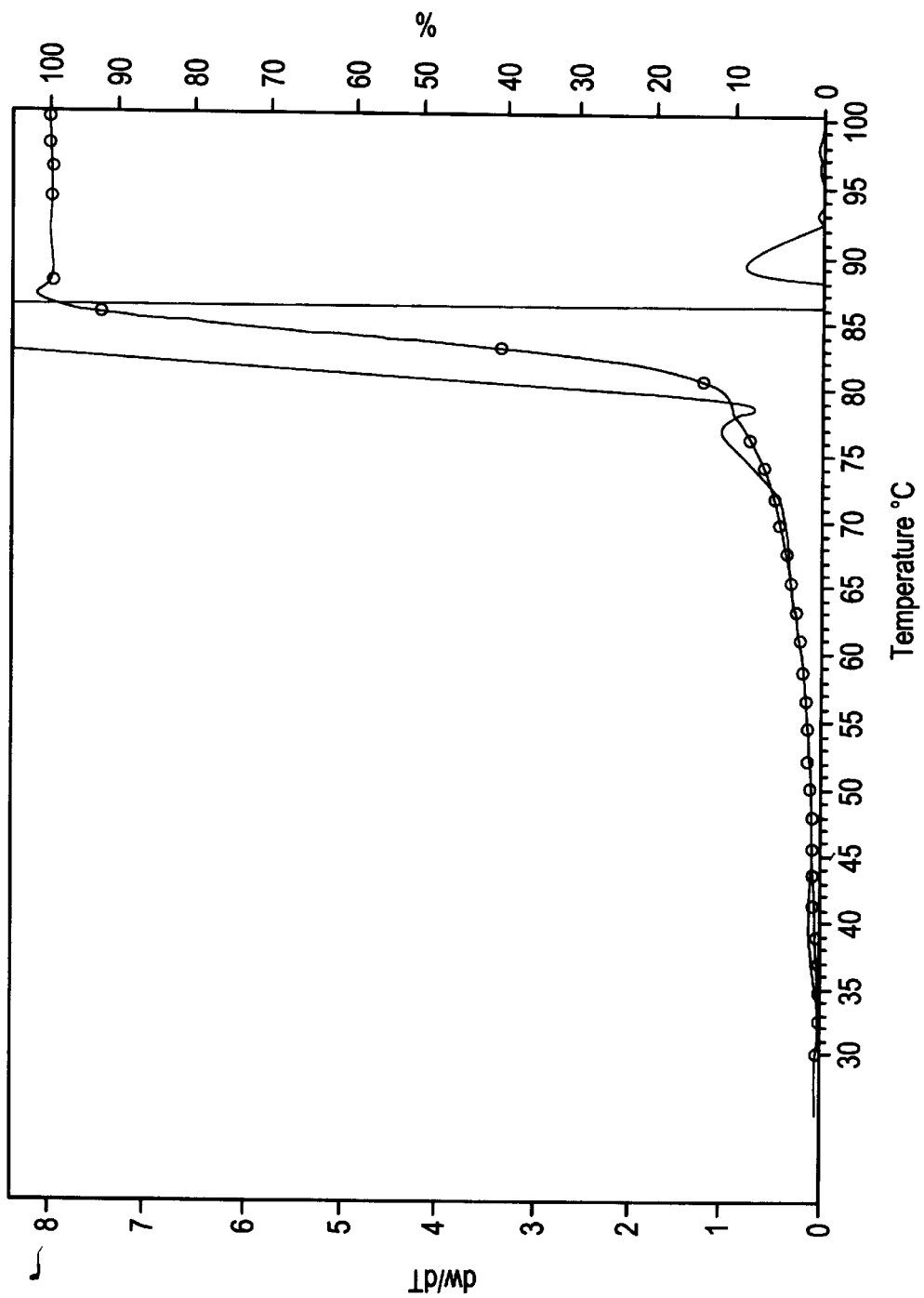
FIGS. 4a, 4b, 4c, and 4d are CRYSTAF crystallization kinetic curves for polymer compositions utilized in preparing fibers of the Comparative Example A, and of Examples 8c, 7c, and 2b of the invention.
Figure 4B:
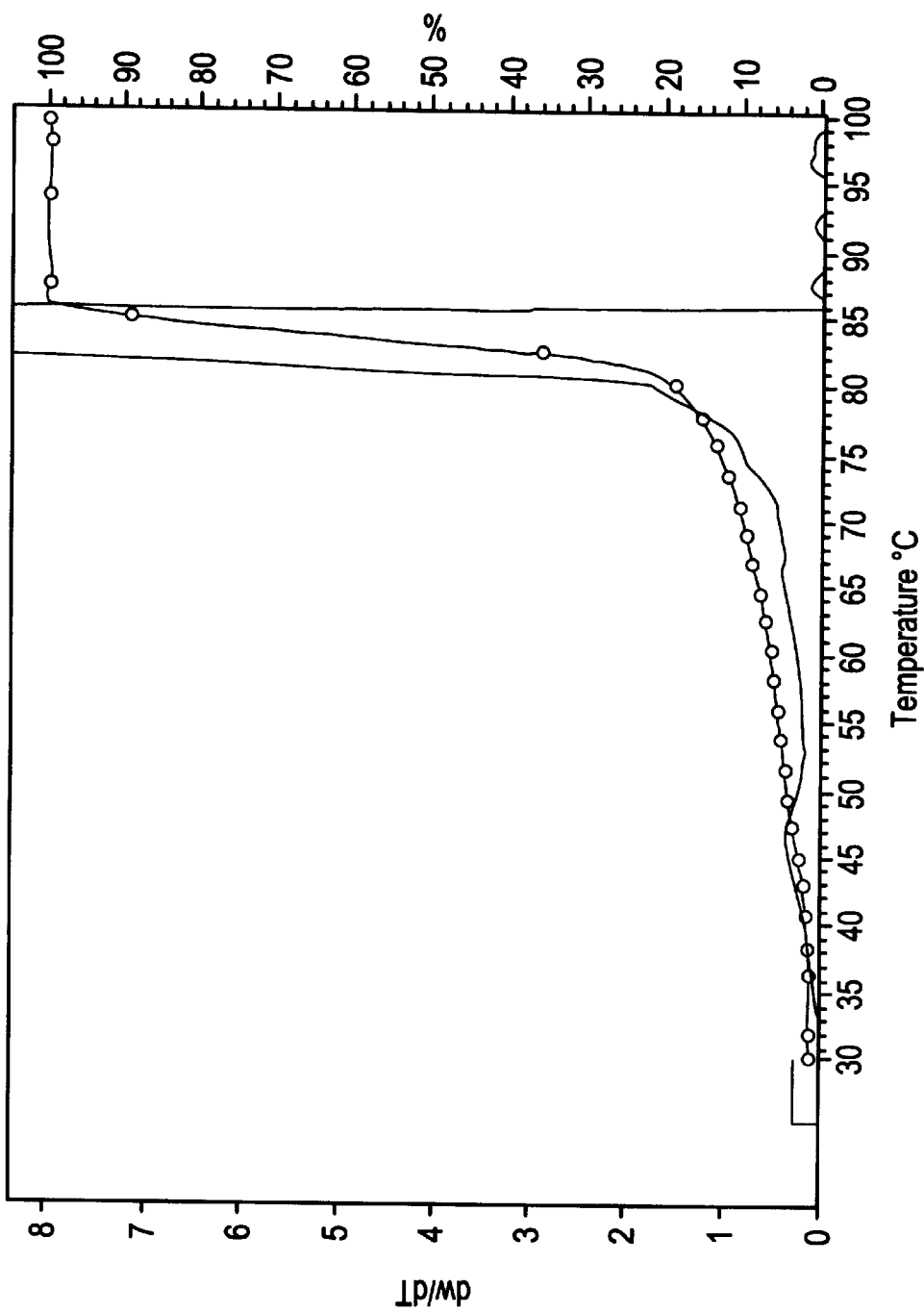
Figure 4C:
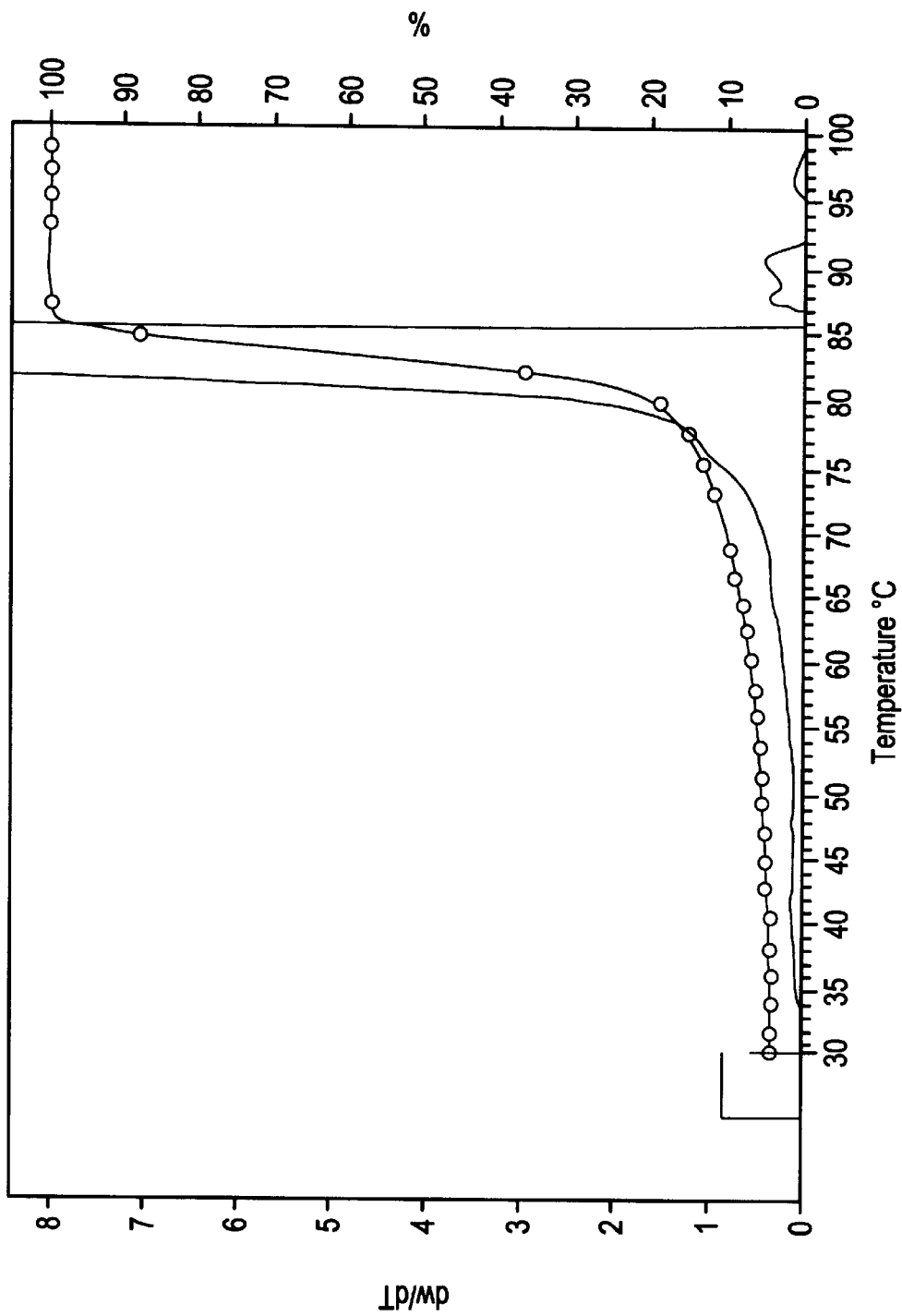
Figure 4D:
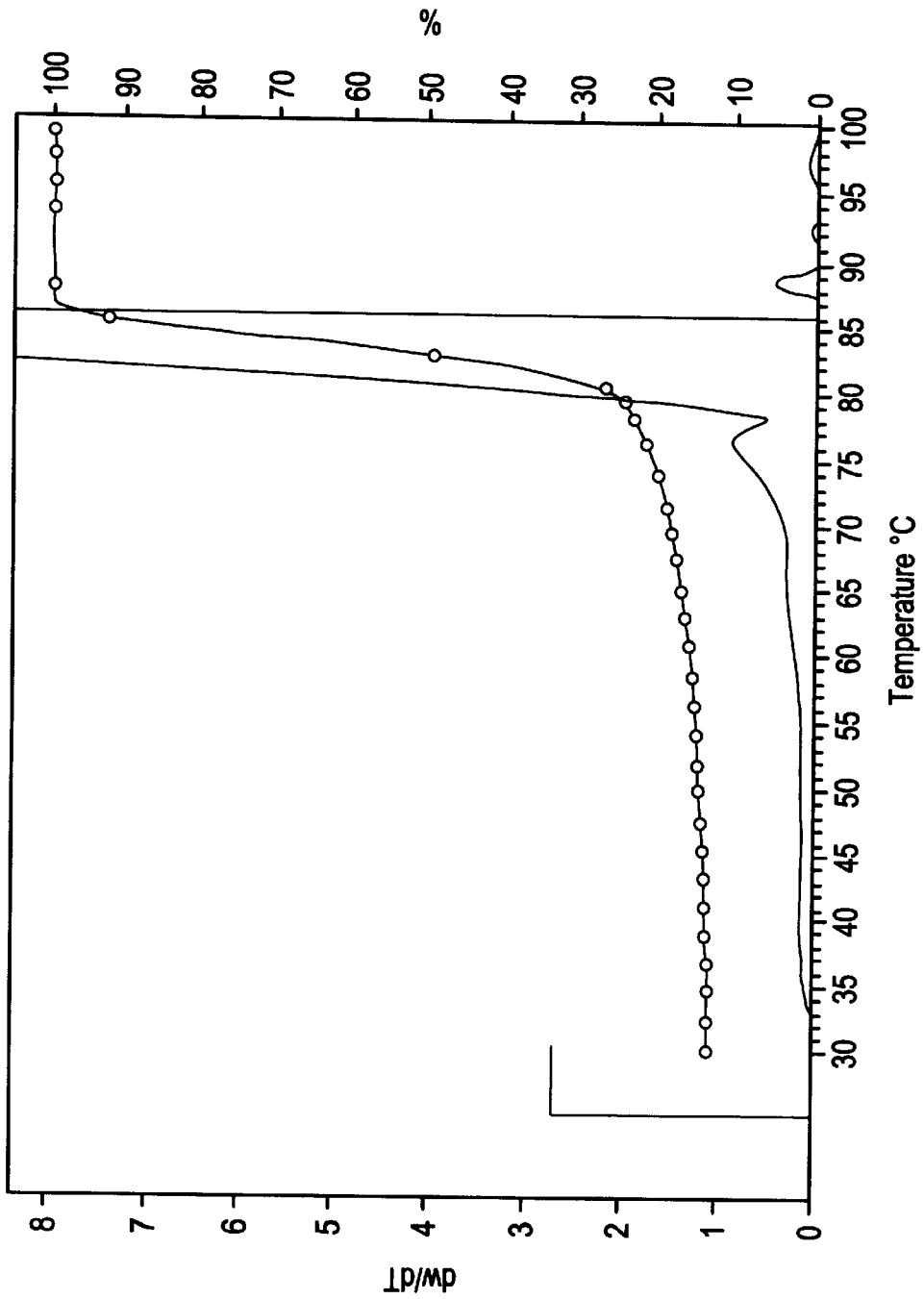

Spinning:

Spinning was conducted on an Alex James laboratory scale spinning apparatus (available from Alex James, Inc.). The resins to be tested were fed to a 1 inch×24 inches single screw extruder, with melt temperature varying from 195° C. to 220° C. The molten polymer feeds to a Zenith gear pump at 1.752 cc/rev. The polymer flows through a triple screen configuration (20/400/20 mesh) for all tests, e.g., spinnability, fabric elongation, and fabric strength, except for the spinnability tests shown in FIG. 3, wherein the polymer flows through a triple screen configuration (20/200/20 mesh). The polymer then exits through a spinneret containing 108 holes, each with a diameter of 400 μm, where L/D of the hole is 4/1. The molten polymer is extruded at 0.37 grams/minute from each hole, and is air cooled by a quench chamber.

The extruded fibers move down 3 meters to a 6 inch diameter feed godet (1×draw, i.e., no cold drawing occurred), then a 6 inch diameter winder godet. The godets are set to 2000–2200 rotations per minute (rpm). The fibers are of 3.0 to 3.5 denier at these conditions. A sample is collected for 2 minutes on the second godet, then cut from the godet. The sample is then cut into 1 inch to 1.5 inch lengths, known as staple fibers, and left to relax for minimum 24 hours. The fiber aging, while not required for fabric production, was used to promote laboratory consistency.

Spinnability of the fiber samples was determined as follows. At the same temperature and pressure conditions as described for spinning to make fibers for fabric, additional fibers were drawn on the 6 inch diameter godet rolls. The number of rotations of the godet rolls per minute (rpm's) were increased until 3 to 5 fiber breaks were noted at the die. The rpm's at breakage was recorded as the maximum rpm's at which the polymer could be spun, and was repeated one or two times, with the average value being reported in the Tables. This, then, is the finest denier that could be spun before degradation in spinning occurred from the fiber breaks.

Carding:

The staple fibers are weighed out as 1.25 g specimens, typically 4–8 specimens per sample. The 1.25 g specimens are fed to a SpinLab Rotor Ring 580 at maximum speed for 45 seconds to card and orient the web, then removed, refed, and recarded for another 45 seconds. After the second carding, the 3.5 inch web is removed and placed in a 3.5 inch by 12 inch metal feed tray.

Thermal bonding:

The thermal bonding equipment is a two-roll Beloit Wheeler Model 700 Laboratory Calendar. The top roll is a 5 inches diameter, 12 inches face, hardened chromed, heated steel roll, embossed in a square pattern for 20 percent coverage. The bottom roll is the same, except not embossed. The bond rolls are set at 1000 psi, which is equivalent on this equipment to 340 pounds per linear inch (pli). (1000 psi–400 psi for lower roll to overcome spring force=600 psi×1.988 square inch cylinder area/3.5 inches web width=340 pli.)

The temperatures of the bond rolls are separated by 4° F., with the top roll always being cooler so as not to cause sticking to the embossed roll. The bond rolls were set at a range of temperatures from 228° F. to 250° F. (top roll temperature) and 232° F. to 254° F. (bottom roll temperature). The rolls turn at 23.6 feet/minutes The fiber webs were then passed between the two rolls and removed from the side opposite the feed area. The resultant nonwoven fabrics were then cut into 1 inch×4 inches fabric specimens.

Analysis of Specimens:

Before analysis, each specimen was weighed, and the weight entered into a computer program. The 1 inch×4 inches specimens were positioned lengthwise on a Sintech 10D with a 200 pound load cell, so that 1 inch at each end of the specimen was clamped in the top and bottom grips. The specimens were then pulled, one at a time, at 5 inches/minutes to their breaking point. The computer then used the dimensions of the specimen and the force exerted to calculate the percent strain (elongation) experienced by the specimen, as well as the normalized force to break in grams. The values were then averaged over the specimens within the same blend group at the same temperatures. The values of temperature versus percent strain and temperature versus normalized force to break were then plotted on x-y axes to determine improvements over existing resins.

For the polymer compositions of each of the Examples, except Examples 10b and 12*, the second polymer was the polymer of Comparative Example A, a high density ethylene/octene copolymer prepared with a Ziegler Natta catalyst and having a density of 0.955 gram/centimeters$^3$ and a melt index ($I_2$) of 29 gram/10 minutes.

For the polymer composition of Example 10b, the second polymer was the polymer of Comparative Example E, an ethylene/octene copolymer prepared with a Ziegler Natta catalyst and having a density of 0.955 gram/centimeters$^3$ and a melt index ($I_2$) of 25 gram/10 minutes.

CRYSTAF crystallization kinetic curves were generated using a CRYSTAF instrument available from PolymerChar (Valencia, Spain). The polymer sample is dissolved in 115° C. trichlorobenzene to a concentration of 0.05 weight percent. Once the polymer is dissolved, the solution is cooled to 30° C. at the rate of 0.2° C./minute. During cooling, the instrument takes a sample of the solution at regular intervals, and with an infrared detector measures the concentration of the polymer in the solution. A curve expressing polymer concentration versus temperature is obtained. The derivative of the curve is the short chain branching distribution. The soluble fraction reported in Table One is the amount of polymer in solution at 30° C.

With respect to the data set forth in Table One, overall melt index was calculated in accordance with the following formula:

$$I_2 = [[\text{weight percent}_1 * (I_2)_1]^{-1/3.5} + [\text{weight percent}_2 * (I_2)_2]^{-1/3.5}]^{-3.5}$$

Further, with respect to the data set forth in Table One, overall density was calculated in accordance with the following formula:

$$\text{density} = 1/[\text{weight percent}_1 * 1/\text{density}_1] + [\text{weight percent}_2 * 1/\text{density}_2]$$

TABLE ONE

| Example No. | First Polymer Composition | First Polymer Melt Index (gram/ 10 minutes) | First Polymer Density (gram/ centimeters$^3$) | Amount of First Polymer (wt. percent) | Calculated overall Melt Index (gram/ 10 minutes) | Calculated Overall Density (gram/ centimeters$^3$) | Average Fabric Strength of Last Three Measurements Before Sticking (g) | Percent Change in Force to Break with Respect to Second Polymer | Average Fabric Elongation of Last Three Measurements Before Sticking (percent) | Percent Change in Elongation with Respect to Second Polymer | Spinnability (average maximum draw rpms) | Crystaf soluble fraction at 30° C. |
|---|---|---|---|---|---|---|---|---|---|---|---|---|
| Ex. 1a | 58200.03 | 30 | 0.913 | 36 | 29.35 | 0.939 | 1209 | −20 | 93 | 221 | | N/A |
| Ex. 2a | 58200.02 | 30 | 0.870 | 25 | 29.25 | 0.932 | 1132 | −26 | 147 | 407 | 3200 | N/A |
| Ex. 3a | 59400.00 | 30 | 0.885 | 25 | 29.25 | 0.936 | 1234 | −19 | 102 | 252 | | N/A |
| Ex. 4a | 58300.00 | 13 | 0.871 | 25 | 23.31 | 0.933 | 1331 | −12 | 76 | 162 | | N/A |
| Ex. 5a | EG 8200 | 5 | 0.870 | 25 | 17.09 | 0.932 | 1539 | 1 | 99 | 241 | 3070 | N/A |
| Ex. 6a | KC 8852 | 3 | 0.875 | 25 | 14.13 | 0.934 | 1525 | 0.3 | 105 | 262 | | N/A |
| Ex. 7a | EG 8100 | 1 | 0.870 | 25 | 8.84 | 0.932 | 2251 | 48 | 87 | 200 | 2400 | N/A |
| Ex. 9a | EG 8150 | 0.5 | 0.868 | 25 | 6.29 | 0.932 | 2179 | 43 | 96 | 231 | | N/A |
| Ex. 2b | 58200.02 | 30 | 0.870 | 18 | 29.18 | 0.939 | 1381 | −9 | 80 | 176 | 3200 | 13.4 |
| Ex. 4b | 58300.00 | 13 | 0.871 | 15 | 25.40 | 0.941 | 1340 | −12 | 49 | 69 | | N/A |
| Ex. 5b** | EG 8200 | 5 | 0.870 | 15 | 20.92 | 0.941 | 1591/1535 | 5/1 | 72/43 | 148/47 | 2970/ N/A | N/A |
| Ex. 5b | EG 8200 | 5 | 0.870 | 15 | 20.92 | 0.941 | 1535 | 1 | 72 | 148 | 2970 | N/A |
| Ex. 6b | KC 8852 | 3 | 0.875 | 15 | 18.51 | 0.942 | 1264 | −17 | 69 | 138 | | N/A |
| Ex. 7b | EG 8100 | 1 | 0.870 | 15 | 13.56 | 0.941 | 2294 | 51 | 80 | 176 | 2410 | N/A |
| Ex. 8b | PL 1880 | 1 | 0.902 | 15 | 13.56 | 0.947 | 1848 | 22 | 58 | 100 | 2810 | N/A |
| Ex. 9b | EG 8150 | 0.5 | 0.868 | 15 | 10.73 | 0.941 | 1557 | 2 | 66 | 128 | | N/A |
| Ex. 10b | 82 percent 25455, 18 percent 58200.04 | 70 | 0.870 | 18 | 26.15 | 09.50 | 1083 | −29 | 58 | 100 | | N/A |
| Ex. 11 | C8R11 | 37 | 0.870 | 5 | 29.34 | 0.950 | 1577 | 4 | 60 | 107 | | N/A |
| Ex. 12 | 58200.03 | 30 | 0.913 | 5 | 29.05 | 0.953 | 1734 | 14 | 62 | 114 | | N/A |
| Ex. 12* | — | 12 | 0.910 | 38.9 | 15 | 0.935 | 1774 | 17 | 79 | 172 | N/A | N/A |
| Ex. 3c | 59400.00 | 30 | 0.885 | 5 | 29.05 | 0.951 | 1235 | −19 | 26 | −10 | | N/A |
| Ex. 4c | 58300.00 | 13 | 0.871 | 5 | 27.73 | 0.950 | 1482 | −3 | 33 | 14 | | N/A |
| Ex. 5c | EG 8200 | 5 | 0.870 | 5 | 25.92 | 0.950 | 1425 | −6 | 38 | 31 | 3200 | N/A |
| Ex. 7c | EG 8100 | 1 | 0.870 | 5 | 22.09 | 0.950 | 1972 | 30 | 52 | 79 | 2830 | 4.1 |
| Ex. 8c | PL 1880 | 1 | 0.902 | 5 | 22.09 | 0.952 | 1784 | 17 | 45 | 55 | 2700 | 1.2 |
| Ex. 9c | EG 8150 | 0.5 | 0.868 | 5 | 20.16 | 0.950 | 1884 | 24 | 56 | 93 | 1600 | N/A |
| Ex. 9d | EG 8150 | 0.5 | 0.868 | 2 | 24.96 | 0.953 | 1800 | 18 | N/A | N/A | | N/A |
| Ex. 9e | EG 8150 | 0.5 | 0.868 | 0.5 | 27.92 | 0.955 | 1622 | 7 | N/A | N/A | | N/A |
| Comp. Ex. A | XUS 61800.42 | | | | | | | | | | | |
| Comp. Ex. B | XUS 61800.42 | | | | | | | | | | | |
| Comp. Ex. C | ATTANE ™ 4213 | 0.8 | 0.905 | 5 | | | 1947 | 28 | 50 | 72 | | N/A |
| Comp. Ex. D | ATTANE ™ 4213 | 0.8 | 0.905 | 15 | | | | | | | 1760 | N/A |
| Comp. Ex. E | 25455 | | | | | | | | | | | |

**Two separate experiments
*The second polymer was a heterogeneously branded ethylene/octene targeted to have $I_2$ of 13 gram/10 minutes & density of 0.951.

TABLE TWO

| | Comparative Examples | | | | | |
|---|---|---|---|---|---|---|
| Example No. | Second Polymer Composition | Second Polymer Melt Index (gram/10 minutes) | Second Polymer Density (gram/ centimeters$^3$) | Amount of Second Polymer (wt. percent) | Lower density component density (gram/ centimeters$^3$) | Lower density component Melt Index (gram/10 minutes) | Calculated overall Melt Index (gram/10 minutes)$^1$ |
| Comp. Ex. A | XUS 61800.42 (400 mesh) | 29 | 0.955 | 100 | N/A | N/A | 29 |
| Comp. Ex. B | XUS 61800.42 (200 mesh) | 29 | 0.955 | 100 | N/A | N/A | 29 |
| Comp. Ex. C | ATTANE ™ 4213 | 29 | 0.955 | 95 | 0.905 | 0.8 | 24.23 |
| Comp. | ATTANE ™ | 29 | 0.955 | 85 | 0.905 | 0.8 | 16.92 |

TABLE TWO-continued

Comparative Examples

| | | | | | | | |
|---|---|---|---|---|---|---|---|
| Ex. D | 4213 | | | | | | |
| Comp. Ex. E | 25455 | 25 | 0.955 | 100 | N/A | N/A | 25 |

| Example No. | Calculated Overall Density (gram/centimeters³)² | Average Fabric Strength of Last Three Measurements Before Sticking (g) | Percent Change in Force to Break with Respect to Second Polymer | Average Fabric Elongation of Last Three Measurements Before Sticking (percent) | Percent Change in Elongation with Respect to Second Polymer | Spinnability (average maximum draw rpms) | Crystaf soluble fraction at 30° C. |
|---|---|---|---|---|---|---|---|
| Comp. Ex. A | 0.955 | 1520 | 0 | 29 | 0 | 3200 | 0.2 |
| Comp. Ex. B | 0.955 | N/A | N/A | N/A | N/A | 2930 | N/A |
| Comp. Ex. C | 0.953 | 1947 | 28 | 50 | 72 | N/A | N/A |
| Comp. Ex. D | 0.948 | N/A | N/A | N/A | N/A | 1760 | N/A |
| Comp. Ex. E | 0.955 | 1480 | 0 | 21 | 0 | N/A | N/A |

Various features of the claimed invention are further illustrated in conjunction with the figures In particular, FIG. 1 illustrates the improved bonding performance of fibers of the invention over fibers formed from high density polyethylene. For this FIGURE, the values reported are the average of the three values corresponding to measurements taken at the three highest temperatures before the onset of sticking to the calendar roll.

Table One shows that the addition of 5 weight percent of a substantially linear ethylene/octene copolymer having a density of 0.870 gram/centimeters³ and a melt index ($I_2$) of 1 gram/10 minutes (Example 7c); of 5 weight percent of a substantially linear ethylene/octene copolymer having a density of 0.868 gram/centimeters³ and a melt index ($I_2$) of 0.5 gram/10 minutes (Example 9c), and of 5 weight percent of a heterogeneous ethylene/octene copolymer having a density of 0.905 gram/centimeters³ and a melt index ($I_2$) of 0.8 gram/10 minutes (Comparative Ex. C) to 95 weight percent of Comparative Example A, all improved the bond performance relative to Comparative Example A. However, as set forth in FIG. 3, blends of 15 weight percent of a substantially linear ethylene/octene copolymer having a density of 0.870 gram/centimeters³ and a melt index of 1 gram/10 minutes (Example 7b), and of 15 weight percent of a substantially linear ethylene/octene copolymer having a density of 0.868 gram/centimeters³ and a melt index (12) of 0.5 gram/10 minutes (Example 9b) with 85 weight percent of the polymer of Comparative Example B (the same polymer of Comparative Example A, extruded through a 200 mesh screen rather than a 400 mesh screen), better retained the good spinnability of Comparative Example B than a corresponding blend of 15 weight percent of a heterogeneous ethylene/octene copolymer having a density of 0.905 gram/centimeters³ and a melt index of 0.8 gram/10 minutes (Comparative Ex. D) with 85 weight percent of Comparative Example B.

Figure 2:
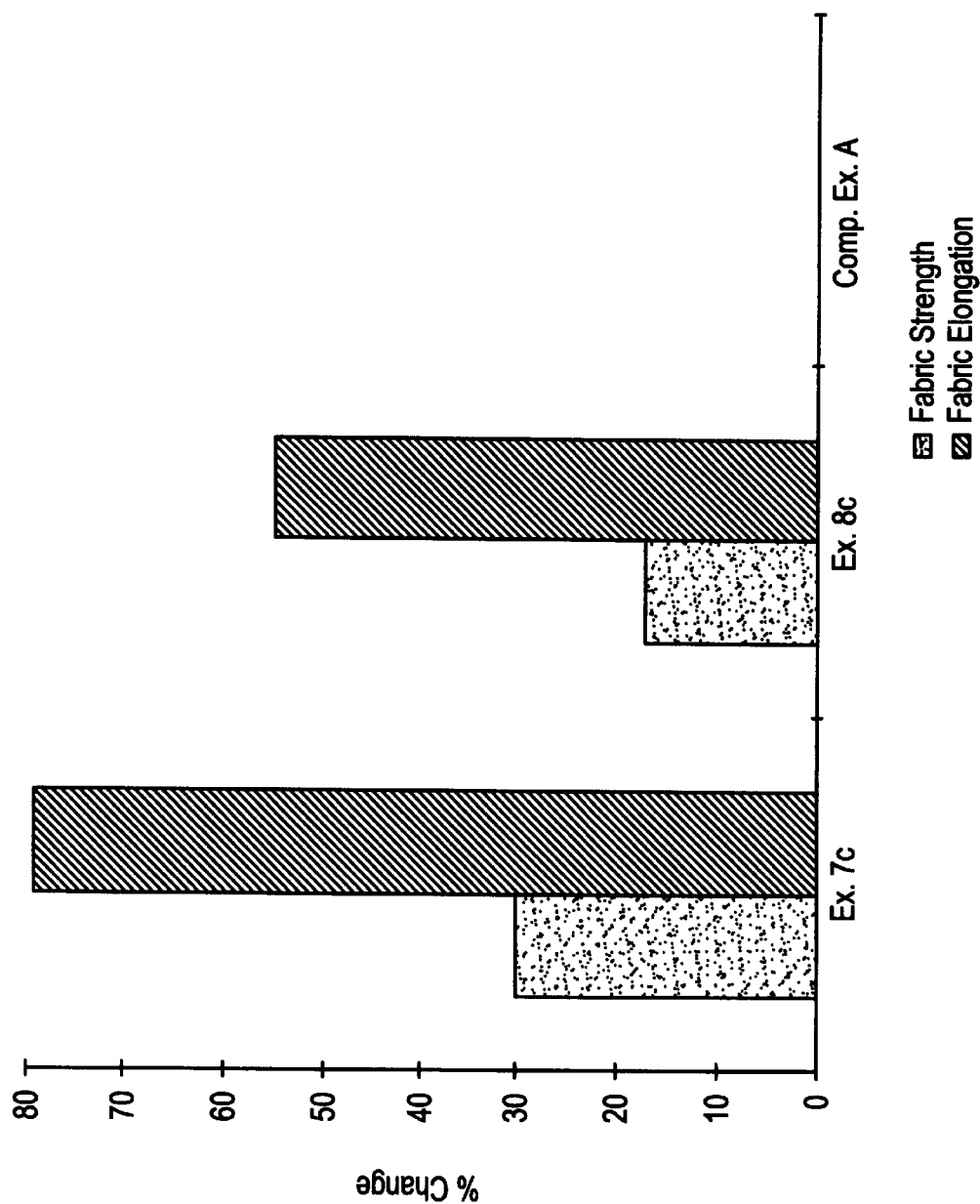
FIG. 2 is a bar chart illustrating the fabric bond strength, fabric elongation, and spinnability of fibers of examples of the invention and comparative examples.

Examples 7c, 8c, and Comparative Example A of FIG. 2 show that for fabrication temperatures below 165° C., e.g., temperatures characteristic of calendar roll bonding, the properties are controlled by the melt point differences of the two components, with the maximum difference giving the maximum bond strength. For FIG. 2, the values reported are the average of the three values corresponding to measurements taken at the three highest temperatures before the onset of sticking to the calendar roll.

A comparison of the Examples of FIG. 1 shows that as the melt index of the first component decreases, the fabric strength generally increases. FIG. 1 farther shows that incorporating higher levels of the lower melting point components generally improves bond strength and elongation. FIG. 1 further shows the spinning-bonding performance comparisons that can be used to optimize a resin for specific fabric performance-spinning performance needs. Examples 5a, 5b, and 5c exhibited a better combination of fabric strength, elongation and fiber spinnability than that of Examples 2a, 2b, and 10. Further, Examples 7a, 7b, and 7c, exhibited a better combination of fabric strength, elongation, and fiber spinnability than that of Examples 5a, 5b, and 5c.

Examples of Rotational Molded Articles

Certain compositions of the invention have found further utility in rotational molded articles. For the Example set forth in Table Three, the blend compositions were prepared by first tumble blending the resin components for 30 minutes. For each of the Examples, the first polymer was a substantially linear ethylene/octene copolymer prepared in accordance with the teachings of U.S. Pat. No. 5,272,236 and U.S. Pat. No. 5,278,272, the teachings of all of which are incorporated herein by reference, and the second polymer was a Ziegler Natta catalyzed ethylene/octene copolymer having a density of 0.941 gram/centimeters³ and a melt index ($I_2$) of 4.0 gram/10 minutes. The blended compositions were processed through a 2.5 inch, NRM single screw extruder to achieve a homogeneous melt blend. The extruder was set at a temperature of 350° F. The melt blends were cut into pellets on a gala under water pelletizing die and were then spin dried.

The pelletized blend samples were formed into molded plaques in accordance with ASTM D-1928, Procedure C, as follows. Press platens were set to 374° F. When the platens reached this temperature, the sample was placed in the press. The pressure was increased to 10,000 psi, which pressure is maintained for 5 minutes. While maintaining the platens at 374° F., the pressure was increased to 30,000 psi, which pressure was maintained for 1 minute. While maintaining the pressure of 30,000 psi, the temperature was decreased at a rate of 40.33° F./minute. When the temperature reached 60° F., that temperature was maintained for 1 minute. The pressure was then released, the platens were open, and the sample was removed. The sample rested at standard temperature and pressure for 40 hours.

The compression molded plaques were tested for various physical properties, with the results being set forth in the following Table Three.

Flexural modulus was measured in accordance with ASTM D-790.

ESCR, 10 percent Igepal, was measured in accordance with ASTM D-1693.

Izod impact (−40 percent C) was measured in accordance with ASTM D-256.

Dart Impact B was measured in accordance with ASTM D-1709.

TABLE THREE

| | Example 12 | Example 13 |
|---|---|---|
| Weight percent of the first polymer | 10.7 | 8.4 |
| Density of the first polymer (gram/centimeters$^3$) | 0.885 | 0.870 |
| Melt index (I$_2$) of the first polymer (gram/10 minutes) | 1.0 | 1.0 |
| Overall density (gram/centimeters$^3$) | 0.935 | 0.935 |
| Overall melt index (gram/10 minutes) | 3.4 | 3.5 |
| Flexural modulus (psi) | 96821 | 103797 |
| ESCR, 10 percent Igepal (hrs) | 3020 | 1686 |
| Izod Impact, room temperature (feet-pounds/inches) | 10.0 | 9.0 |
| Dart B | 1753 | 1645 |

We claim:

1. A rotational molded article comprising a polymer composition having improved bond strength which in turn comprises:
   a. from 0.5 percent to less than 15 weight percent (by weight of the polymer blend) of a first polymer which is a homogeneous ethylene/α-olefin interpolymer having
      i. a melt index of from 0.1 to 100 grams/10 minutes,
      ii. a density of from 0.855 to 0.890 grams/centimeters$^3$, and
   b. a second polymer which is an ethylene homopolymer or an ethylene/α-olefin interpolymer having
      i. a melt index of from 0.5 to 500 grams/10 minutes, and
      ii. a density which is at least 0.01 grams/centimeters$^3$ greater than the density of the first polymer.

2. The rotational molded article of claim 1, wherein the melt index of the first polymer is from 0.5 to 5 grams/10 minutes.

3. The rotational molded article of claim 1, wherein the first polymer is an interpolymer of ethylene and at least one C$_3$–C$_{20}$ α-olefin.

4. The rotational molded article of claim 1, wherein the first polymer has a density of from 0.855 to 0.880 gram/centimeters$^3$.

5. The rotational molded article of claim 1, wherein the first polymer is a substantially linear ethylene/α-olefin interpolymer having from 0.01 to 0.3 long chain branches/1000 carbons.

6. The rotational molded article of claim 1, wherein the first polymer is a substantially linear ethylene/α-olefin interpolymer characterized as having:
   a. a melt flow ratio (I$_{10}$/I$_2$) ≧ 5.63,
   b. a molecular weight distribution, Mw/Mn, defined by the inequality:

$$Mw/Mn \leq (I_{10}/I_2) - 4.63, \text{ and}$$

c. a critical shear rate at the onset of surface melt fracture which is at least 50 percent greater than the critical shear rate at the onset of surface melt fracture of a linear ethylene/α-olefin interpolymer having the same I$_2$ and M$_w$/M$_n$.

7. The rotational molded article of claim 1, wherein the second polymer is a homogeneous ethylene polymer characterized as having:
   a. a molecular weight distribution, M$_w$/M$_n$ which is from 1.5 to 3.0, and
   b. when the second polymer is an ethylene/α-olefin interpolymer, a CDBI of at least 50.

8. The rotational molded article of claim 1, wherein the second polymer is a substantially linear ethylene polymer characterized as having from 0.01 to 0.3 long chain branches/1000 carbons.

9. The rotational molded article of claim 1, wherein the second polymer is a substantially linear ethylene polymer characterized as having:
   a. a melt flow ratio (I$_{10}$/I$_2$) ≧ 5.63,
   b. a molecular weight distribution, Mw/Mn, defined by the inequality:

$$Mw/Mn \leq (I_{10}/I_2) - 4.63, \text{ and}$$

c. a critical shear rate at the onset of surface melt fracture which is at least 50 percent greater than the critical shear rate at the onset of surface melt fracture of a linear ethylene/α-olefin interpolymer having the same I$_2$ and M$_w$/M$_n$.

10. The rotational molded article of claim 1, wherein the second polymer has a density that is at last 0.03 gram/centimeters$^3$ greater than the density of the first polymer.

11. The rotational molded article of claim 1, wherein the second polymer has a density that is at least 0.05 gram/centimeters$^3$ greater than the density of the first polymer.

* * * * *